A. SWIFT.
Butter Worker.
No. 42,238. Patented April 5, 1864.
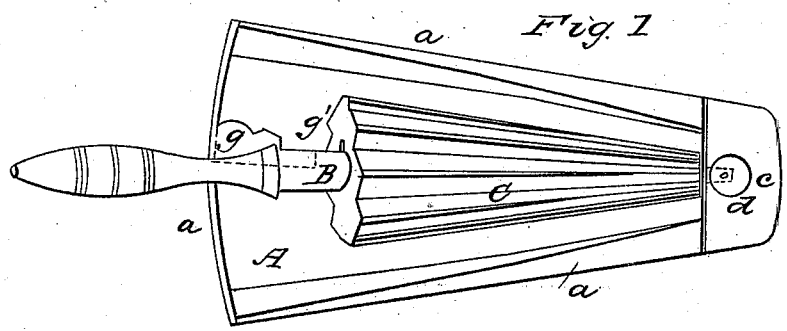
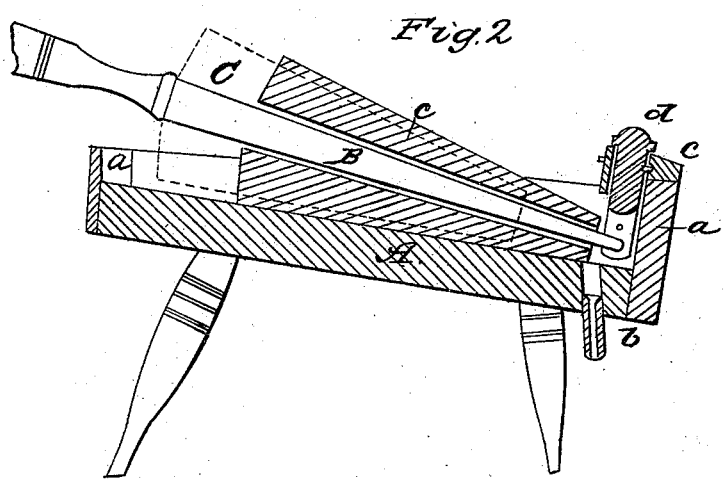 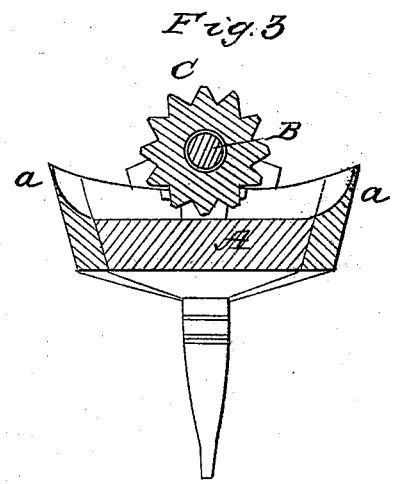
Witnesses
T. Campbell
O. Schafer
Inventor
Almon Swift
by his atty,
Mason, Fenwick & Lawrence

UNITED STATES PATENT OFFICE.

ALMON SWIFT, OF EAST ELMORE, VERMONT.

IMPROVEMENT IN BUTTER-WORKERS.

Specification forming part of Letters Patent No. 42,238, dated April 5, 1864.

*To all whom it may concern:*

Be it known that I, ALMON SWIFT, of East Elmore, county of Lamoille, State of Vermont, have invented a new and Improved Butter-Worker; and I do hereby declare that the following is a full, clear, and exact description thereof, reference being had to the accompanying drawings, making a part of this specification, in which—

Figure 1 is a top view of my improved machine, arranged for working butter. Fig. 2 is a vertical longitudinal section through Fig. 1. Fig. 3 is a vertical transverse section through the machine.

Similar letters of reference indicate corresponding parts in the several figures.

The object of my invention is to construct a simple and cheap machine by which butter can be "worked," salted, and prepared for the market, in a very expeditious manner.

To enable others skilled in the art to make and use my invention, I will proceed to describe its construction and operation.

My invention relates to that class of butter-working wherein a conical roller is employed in connection with an inclined segmental bed.

In such machines as hitherto constructed no provision is made for turning, kneading, and working the salt into the mass after the buttermilk is extracted therefrom, and this work must be afterward done by hand or another machine adapted to the purpose. By my invention, it will be hereinafter shown, I provide for turning, kneading, and working the salt into the butter by the cone and handle which are used in the previous operation for rolling the butter to get rid of the buttermilk.

In the accompanying drawings, A represents an inclined segmental table, which is mounted on legs and surrounded by a ledge, *a*, which causes all the buttermilk extracted from the butter during the rolling operation to flow down to a common discharge-pipe, *b*, Fig. 2. At the lower or pointed end of the table A, and secured across the top of the ledge at this point, is a thick bearing-block, *c*, through which a hole is made, perpendicular to the plane of the table, for receiving the button-head pin *d*. The lower end of this pin is forked for the purpose of receiving, and having attached to it by a pivot, the lower end of a shaft, B, as shown in Fig. 2. The pin *d* is allowed to turn loosely in the block *c*, and it is kept in its place in this block by a groove and pin, as shown in Fig. 2. The shaft B, being pivoted to a loosely-rocking pin, *d*, it will be seen that this shaft is capable of receiving a lateral and also a vertical motion, and yet be attached to the table.

Upon shaft B is placed a fluted conical roller, C, which is about two-thirds the length of the table A. This cone is allowed to turn freely around its shaft B when in the position indicated in Figs. 1 and 2 in black lines, and when in this position it is used for rolling and expressing the buttermilk from the butter. The shaft B is made of sufficient length to allow of the cone being drawn up to the upper end of the table A, at which point the cone is keyed to its shaft by the sliding wedge *g*, which is forced into a groove, *g'*, in the end of this cone. When thus fixed on the vibrating shaft, the cone is used to scrape, knead, and pound the butter so as to thoroughly impregnate it with salt. The wedge-key *g* is let into a longitudinal groove in the extended handle portion of the shaft B, and will not be in the way in using the machine.

In order to carry out my invention perfectly it is necessary to employ a fluted cone, as this cone forms channels in the butter during the operation of rolling it, down which channels the buttermilk flows and thus freely escapes from the butter, and then when it is required to salt the butter the fluting around the cone serves to scrape up the butter from the table and to knead the salt into the butter in a thorough and rapid manner. By this arrangement it will be seen that I make the fluted cone serve the double purpose of a roller and a kneading-bar, and am thus enabled to perform the entire operation of solidifying and salting butter upon a single table and by one and the same tool.

I do not claim as my invention the use of a vibrating rolling cone, working upon an inclined segmental table for pressing out the buttermilk from butter. Neither do I claim broadly, the use of a vibrating kneading-bar, or beater, for mixing and working salt into the butter when these two machines are considered separately and independently of each other. Neither do I limit myself to a wedge-key for holding the conical roller fast on the shaft when desired, as I desire to avail myself of any and all known practical methods or devices that will render the roller C fast or loose on the shaft B, at pleasure; but What I do claim as my invention, and desire to secure by Letters Patent, is—

The combination of the shaft B, conical roller C, and a fastening, $g$, or its equivalent, so arranged as to render the roller C, fast or loose on the shaft B, at pleasure, substantially as described.

ALMON SWIFT.

Witnesses:
LOREN B. SWIFT,
R. F. PARKER.